United States Patent [19]
Peterson

[11] 3,900,955
[45] Aug. 26, 1975

[54] APPARATUS FOR RECOVERING SULFURIC ACID AND FERROUS SULFATE CRYSTALS FROM SPENT PICKLE SOLUTION

[76] Inventor: Joseph C. Peterson, 1920 Franklin Blvd., Carmel, Ind. 46032

[22] Filed: Oct. 15, 1973

[21] Appl. No.: 406,571

[52] U.S. Cl............ 23/273 R; 23/273 F; 23/305 F; 423/558; 423/142; 423/531; 62/58; 62/123; 210/108; 210/341
[51] Int. Cl.²...................... B01D 9/02; C01G 49/14
[58] Field of Search ........... 210/108, 413, 414, 415, 210/340, 342, 341; 23/305, 273 R, 273 F; 62/58, 123; 423/140, 142, 146, 531, 558, 150; 134/3, 41, 18, 110

[56] References Cited
UNITED STATES PATENTS

| | | | |
|---|---|---|---|
| 1,450,216 | 4/1923 | Marsh | 23/305 |
| 2,078,088 | 4/1937 | Mantius | 23/305 |
| 2,322,134 | 6/1943 | Hodge | 23/305 |
| 2,484,799 | 10/1949 | Swindin | 23/305 |
| 2,960,391 | 11/1960 | Sweet | 23/305 |
| 3,447,684 | 6/1969 | Morrison | 210/108 |

OTHER PUBLICATIONS
Crown Pollution Control–Acid Recovery System, 1971.

Primary Examiner—Norman Yudkoff
Assistant Examiner—S. J. Emery
Attorney, Agent, or Firm—Woodard, Weikart, Emhardt & Naughton

[57] ABSTRACT

Method and apparatus for recovering sulfuric acid and ferrous sulfate crystals from a spent aqueous sulfuric acid pickling solution. The apparatus includes a treating tank, settling tank, and crystal strainer. The tanks utilize sloped bottoms to aid in crystal collection, and the settling tank includes baffle plates to promote settling of crystals. The crystal strainer is of a continuously operable type, and the system is automatically controlled.

1 Claim, 3 Drawing Figures

Fig.1

APPARATUS FOR RECOVERING SULFURIC ACID AND FERROUS SULFATE CRYSTALS FROM SPENT PICKLE SOLUTION

BACKGROUND OF THE INVENTION

1. Field of the Invention

The invention is in the field of cleaning and liquid contact with solids by crystallizing, precipitating or eliminating dissolved solids from a used agent.

2. Description of the Prior Art

Pickling iron and steel to remove rust and scale has traditionally been done using an aqueous sulfuric acid solution. The pickling process produces soluble iron sulfates in the solution, and when the iron sulfate concentration reaches a saturation level in the solution, the solution must be disposed of or regenerated by removal of the dissolved iron.

Methods and apparatus for removal of dissolved iron from spent pickling solutions are disclosed, for example, in U.S. Pat. Nos. 3,575,711 to Krofchak, 2,709,143 to Francis et al., and 2,188,802 to Barkholt.

As disclosed in these patents, the spent pickling solution may be cooled and agitated so that ferrous sulfate crystals settle out of the solution. Generally, the crystals formed are of various sizes, are difficult to remove from solution efficiently, and are difficult to handle after removal. A crystal strainer, such as is employed in the presently described method, is available from the Elliot Division of the Camer Manufacturing Company and is designated as a type ECA strainer model.

SUMMARY OF THE INVENTION

One embodiment of the present invention includes, in a system for recovering sulfuric acid and ferrous sulfate crystals from a spent aqueous sulfuric acid pickling solution, which includes a first container containing solution, means for cooling the solution in the first container, means for agitating the solution in the first container, a crystal strainer, and first pump means for circulating the solution in the first container through the strainer, the improvement which comprises the use of a strainer which includes a housing defining an enclosed area and having an inlet, two crystal outlets and a fluid outlet, a porous shell within the enclosed area including two portions each having a first and a second opening, the first opening of each of the portions being positioned adjacent the inlet, the second opening of each of the portions being coupled to a different one of the two crystal outlets, the fluid outlet being in communication with the porous shell, and means for successively coupling the inlet to the first opening of alternate portions of the porous shell; and a second container coupled to the crystal outlets of the strainer for accumulating the ferrous sulfate crystals.

An object of the present invention is to provide a method and apparatus for removal of ferrous sulfate from spent pickling solutions wherein ferrous sulfate crystals may be removed from the pickling solution easily and efficiently.

Another object of the present invention is to provide a method and apparatus for removal of ferrous sulfate from spent pickling solutions wherein crystals of ferrous sulfate are easily handled after removal from the solution.

DESCRIPTION OF THE PREFERRED EMBODIMENT

Figure 1:
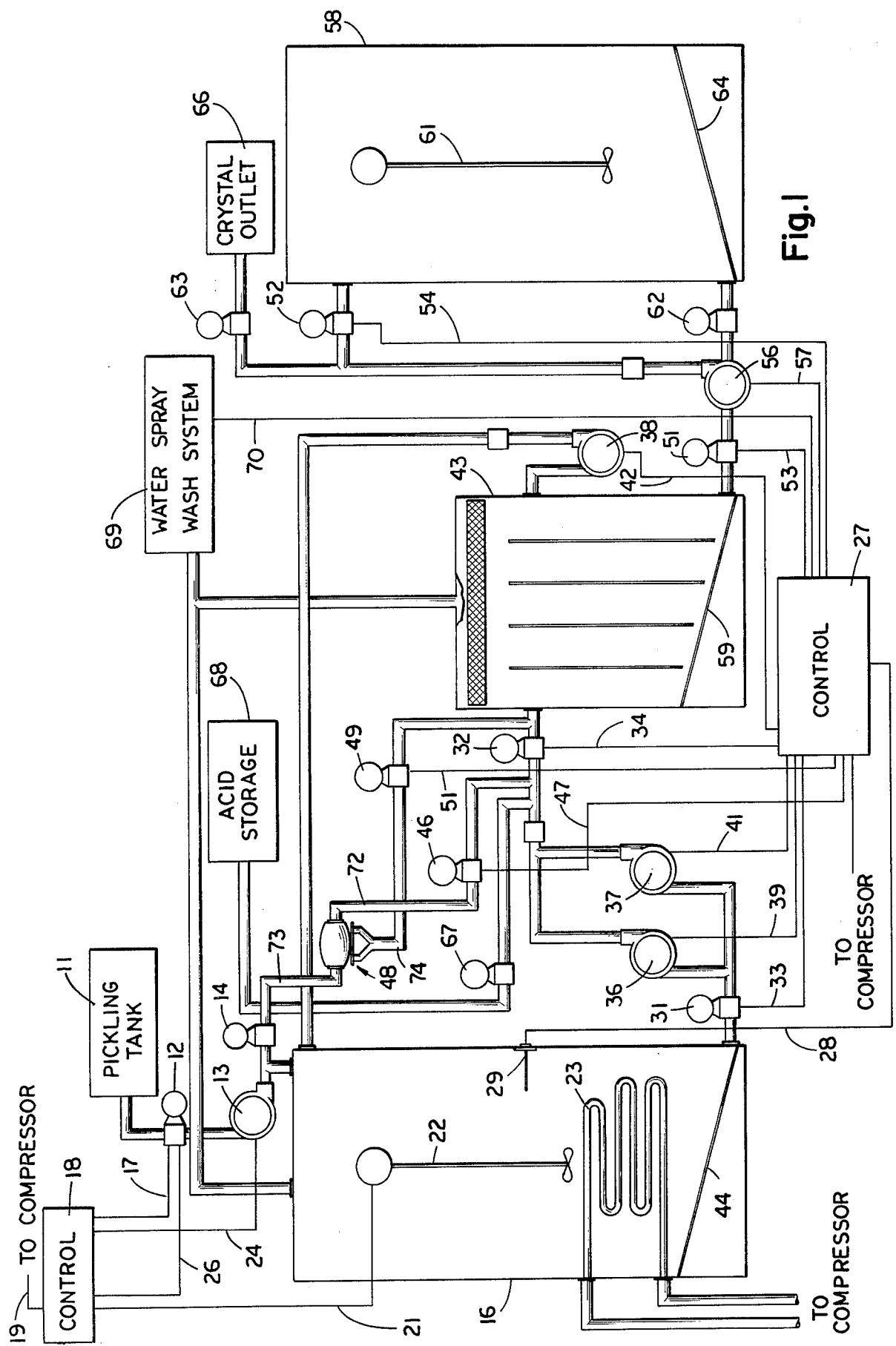
FIG. 1 shows apparatus for removal of ferrous sulfate from spent pickling solutions according to the present invention.

For the purposes of promoting an understanding of the principles of the invention, reference will now be made to the embodiment illustrated in the drawings and specific language will be used to describe the same.

Referring in particular to FIG. 1, when spent pickling solution is available to be processed, valve 12 is opened and pump 13 pumps the solution from pickling tank 11 into treating tank 16, valve 14 being closed. Pressure sensor lead 17 coupled from valve 12 to control 18 indicates the introduction of the spent pickling solution into treating tank 16. Control 18 initiates the operation of a refrigeration compressor (not shown) through lead 19, which starts the cooling of the solution in treating tank 16 by cooling coils 23. Control 18 also initiates the action of agitator 22 through lead 21.

Once no more solution is flowing through pump 13, control 18 is activated through lead 24 to close valve 12 in conjunction with lead 26. The action of pump 13 also stops due to control 18 acting through lead 24. The spent solution in treating tank 16 is agitated by agitator 22 and cooled by coils 23 until the temperature of the solution reaches 70° F.

When the temperature of this solution in treating tank 16 reaches 70° F, control 27 is activated through lead 28 by temperature probe 29 in treating tank 16. Control 27 then opens valves 31 and 32 acting through leads 33 and 34, respectively. At this time, control 27 also initiates the action of pumps 36, 37 and 38 acting through leads 39, 41 and 42, respectively.

The solution in treating tank 16 is pumped through valve 31 by pumps 36 and 37 through valve 32 and into settling tank 43. As shown in FIG. 1, the solution is pumped from treating tank 16 at the bottom at the lowest point of sloped surface 44 and into settling tank 43 near the top. Thereby, any crystals formed in treating tank 16 are pumped into settling tank 43. Pump 38 pumps solution from near the top of settling tank 43 back into the top of treating tank 16, thereby tending to recirculate solution rather than crystals back to the treating tank. The cooling action of coils 23 continues during this portion of the process as does agitator 22.

During this time, ferrous sulfate crystals settle to the bottom of settling tank 43. When control 27 obtains an indication from temperature probe 29 through lead 28, that the temperature of the solution in settling tank 16 has reached 40° F, control 27 closes valve 32 through lead 34 and stops pump 38 through lead 42. At this time, control 27 opens valve 46 through lead 47. Pumps 36 and 37 pump solution and collected crystals from the bottom of treating tank 16 through valve 46 and through a crystal strainer, generally indicated as 48, and back into the top of treating tank 16 through check valve 14. Crystal strainer 47, as shall be described more completely hereinafter, comprises two chambers and operates continuously, the crystals collected in the strainer being flushed through valve 49 into settling tank 43. Valve 49 was opened by control 27 through lead 51 at the same time as valve 46, providing a path for crystals from strainer 48 to settling tank 43.

When the temperature of the solution in treating tank 16 reaches 30° F, as indicated by temperature probe 29 through lead 28 to control 27, control 27 stops pumps 36 and 37 through leads 39 and 41, respectively, and closes valve 46 through lead 47. At this time, settling tank 43 contains a slurry of ferrous sulfate crystals and treating tank 16 contains reclaimed acid.

At the same time, when the solution in treating tank 16 reaches 30° F, control 27 opens valves 51 and 52 through leads 53 and 54, respectively. Control 27 also initiates the action of pump 56 through lead 57, and pump 56 pumps the ferrous sulfate crystal slurry from the bottom of settling tank 43 into crystal storage tank 58. The crystal slurry in settling tank 43 is easily removed by pump 56 at the bottom of inclined slope 59 in settling tank 43. Settling tank 43 shall be discussed in more detail hereinafter.

Water is sprayed in settling tank 43 during the transfer of ferrous sulfate crystal slurry from settling tank 43 to storage tank 58. The crystals are stored in storage tank 58 and agitated by agitator 61 until they are removed for shipment. At the time of shipment, valves 51 and 52 are closed and valves 62 and 63 are opened, and crystal pump 56 pumps the crystal slurry from the bottom of the incline 64 of storage tank 58 through valve 62 and valve 63 into a desired crystal outlet 66, such as a tank truck or railroad car.

Figure 2:
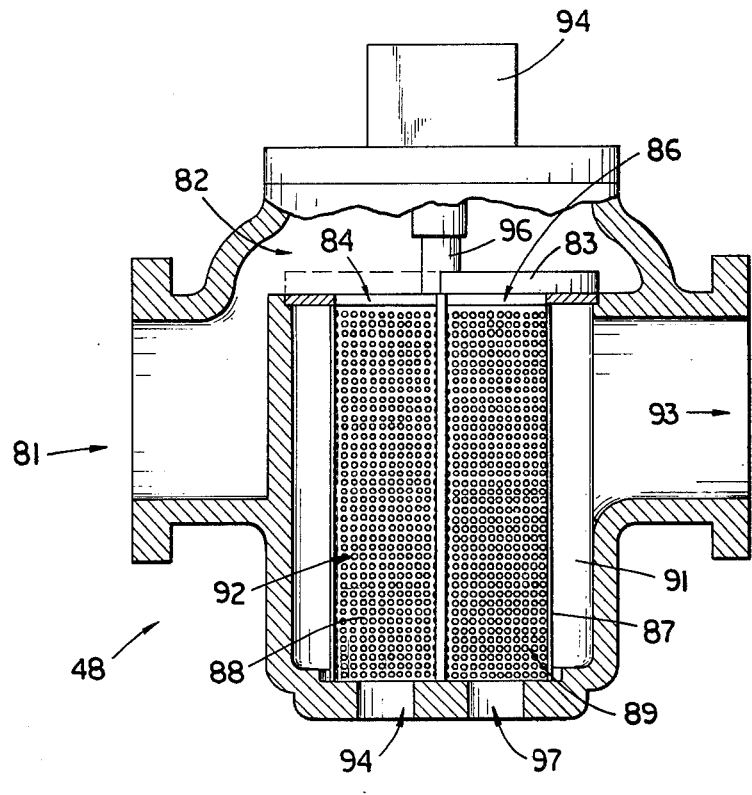
FIG. 2 is a center cross section of the crystal strainer shown in FIG. 1.

The reclaimed acid left in treating tank 16 after treatment process is then reused or stored. For example, to return the reclaimed acid to storage, valves 31 and 67 are opened and pumps 36 and 37 pump the reclaimed acid from the bottom of treatment tank 16 into storage tank 68 after treating tank 16 and settling tank 43 are emptied. Control 27 activates water spray wash system 69 through lead 70. Water flows from wash system 69 into the top of treating tank 16 in the top of settling tank 43. Control 27 opens valves 31 and 46 and activates pumps 36 and 37 to pump water through crystal strainer 48 and back into treating tank 16. Then valve 46 is closed by control 27 and valve 32 is opened to allow water to be pumped from treating tank 16 into settling tank 43. At this time, wash system 69 is turned off by control 27, and then control 27 opens valves 51 and 52 and turns on pump 56, pumping the water from settling tank 43 into crystal storage tank 58. When no more water is available to pump from the treating tank and the settling tank, the valves are returned to a closed position and pumps turned off by control 27. The water is then drained from crystal storage tank 58, or control 27 activates pump 56 and opens valves 62 and 63 to pump the water out of crystal storage tank 58. In FIG. 2, there is illustrated an enlarged cross sectional view of the crystal strainer 48 shown in FIG. 1. The input to strainer 48 is through opening 81, which is connected to pipe 72 (FIG. 1). Solution flows into opening 81 and into the upper area of the strainer 82. Semi-circular disc 83 is disposed over either opening 84 or 86 in strainer basket 87. As illustrated, solution flows from area 82 through opening 84 into section 88 of strainer basket 87. Strainer basket 87 is cylindrical in shape and of smaller diameter than cavity 91 in strainer 48 in which basket 87 is mounted. The solution in section 88 of strainer basket 87 flows through holes such as 92 in basket 87 into cavity 91 outside the strainer basket. Crystals in the solution are trapped within the basket, and the solution in cavity 91 flows out through opening 93 into pipe 73 (FIG. 1).

Control 94 on crystal strainer 48 senses the pressure differential between the incoming solution at opening 81 and the outgoing solution at opening 93 to determine when a sufficient amount of crystals have been collected in portion 88 of strainer basket 87. When sufficient crystals have been collected to cause a predetermined pressure drop, control 94 causes disc 83 to be rotated 180° about shaft 96 so that disc 83 covers portion 88 of basket 87 and uncovers opening 86 of portion 89 of basket 87. The solution entering opening 81 now flows into area 82 through opening 86 into basket portion 89, through the holes in the basket, into cavity 91 and out opening 93. Crystals are now retained in portion 89 of filter basket 87. As can be seen in FIG. 2, the solution passing from inside filter basket 87 into cavity 91 also is impelled to flow through holes such as 92 in basket 87 into portion 88. This action by the solution flushes the crystals gathered in portion 88 through drain opening 94 which is coupled to pipe 74 (FIG. 1). Relative sizes of openings 94 and 93 allow only a small amount of solution to be lost with the crystals through opening 94. An opening 97 is provided in communication with the bottom of portion 89 of basket 87 so that crystals are flushed through opening 97 when disc 83 is disposed over opening 84 rather than opening 86.

Figure 3:
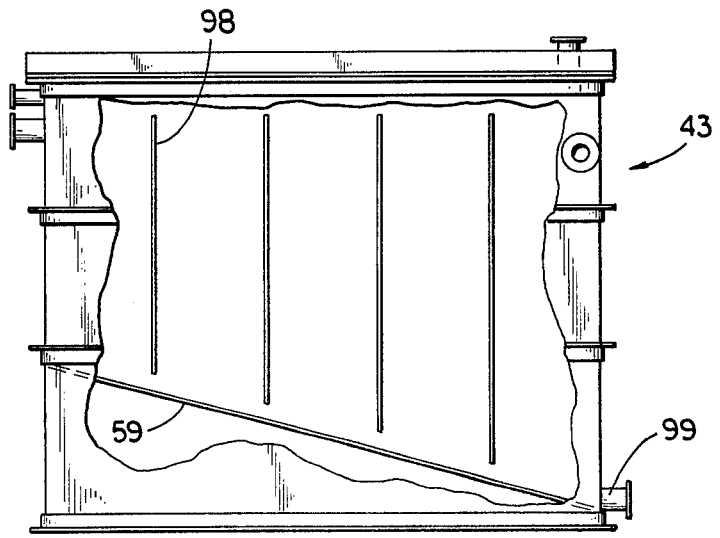
FIG. 3 is an enlarged fragmentary view of the settling tank of FIG. 1.

FIG. 3 shows a fragmentary view of the settling tank 43 of FIG. 1. As shown in FIG. 3, the settling tank 43 contains a sloped bottom 59 to facilitate the gathering of the crystals at the bottom of the slope. The settling tank is cylindrical in shape while sloped bottom 59 is in the form of an inclined plane whereby the lowest point as illustrated in the bottom of the tank 43 is at the extreme right where outlet 99 is provided. Baffle plates such as 98 are provided to reduce the agitation of the solution in settling tank 43 to promote the formation of crystals therein. Conversely, agitator 22 is provided in treating tank 16 (FIG. 1) to inhibit the formation of crystals in the treating tank. The baffle plates 98 are rigidly attached along their side edges to the walls of settling tank 43 and extend to a point above sloped bottom 59 and below the top of the settling tank.

While there have been described above, the principles of this invention in connection with specific apparatus, it is to be clearly understood that this description is made only by way of example and not as a limitation in the scope of the invention.

What is claimed is:

1. Apparatus for recovering sulfuric acid and ferrous sulfate crystals from a spent aqueous sulfuric acid pickling solution comprising:

a first container initially containing the spent aqueous sulfuric acid pickling solution, the bottom of said first container being inclined and having its lowest end adjacent one side of said container; an inlet conduit including a pump connecting the upper end of said first container with a pickling tank for delivering pickling solution from the tank to said first container;

a refrigerant coil in the lower portion of said first container for actively cooling the solution in said first to about 30°F.;

propeller means located just above said refrigerant coil in said first container for agitating the solution therein;

a second container, the bottom of said second container being inclined and having its lowest end adjacent one side of said container;

a plurality of vertical baffles in said second container disposed transverse to the slope of said bottom and extending from the upper portion of said second container to within close proximity of said bottom; filter means disposed horizontally across the upper portion of said second container;

a third container having an inclined bottom having its lowest end adjacent one side of the container; propeller agitating means in said third container;

crystal strainer means having an inlet for crystal slurry on one side and coaxially aligned therewith a filtered liquid outlet on the opposite side; a vertically aligned perforated cylindrical filter basket disposed between said inlet and outlet such that slurry introduced through said inlet passes into the top of said basket, the crystals are filtered from the slurry and the liquid passes radially outwardly through the perforations and out through said outlet; said basket being divided into two sections by a vertical baffle extending transversely of the axis of said inlet and outlet; a semi-circular disc disposed over the top of said basket and mounted for rotation such that upon rotation alternately covers one and then the other of the top openings of said basket;

pressure sensing means for sensing the pressure drop between the inlet and outlet of said strainer and comparing it to a predetermined value and in response thereto rotating said semi-circular disc to the other top opening of the basket;

two adjacent bottom outlets for crystals in the bottom of said strainer, one connected to each of the bottoms of the sections of the basket; two conduit means each connecting one of the two adjacent bottom outlets of the strainer to a further conduit section which in turn connects with the upper portion of the second container adjacent the side connected with the upper end of the inclined bottom;

a valved outlet conduit including a pump in the lowest end of the first container; conduit means including a valve connecting said valved oulet conduit with the inlet end of said strainer for delivering slurry from the first container to the strainer; a further valved conduit connecting said valved outlet conduit with the upper end of said second container in the side connected with the upper end of its inclined bottom; a still further valved conduit connecting said valved outlet conduit with an acid storage tank;

conduit means connecting the liquid outlet of said strainer with the inlet conduit for pickle solution to said first container downstream of the pump therein; conduit means including a pump and valve in series connecting an outlet at the lowest end of the second container and the upper portion of the third container; conduit means including a valve connecting an outlet in the lowest end of the third container and the last mentioned pump; conduit means including a valve connecting the conduit means downstream of the last named pump with a crystal outlet; conduit means including a pump connecting the upper portion of the second container adjacent the side connected with the lowest portion of the inclined bottom therein with the top portion of the first container;

and temperature sensing means in the middle portion of said first container above said refrigerant coil for sensing the temperature therein and controlling circulation of solution in the first container through the crystal strainer.

* * * * *